United States Patent
Murayama et al.

(10) Patent No.: US 8,588,980 B2
(45) Date of Patent: Nov. 19, 2013

(54) POWER ASSIST DEVICE AND CONTROL METHOD THEREFOR

(75) Inventors: Hideyuki Murayama, Toyota (JP); Naoyuki Takesue, Hino (JP); Hideo Fujimoto, Nagoya (JP)

(73) Assignees: Toyota Jidosha Kabushiki Kaisha, Toyota-Shi (JP); National University Corporation Nagoya Institute of Technology, Nagoya (JP)

( * ) Notice: Subject to any disclaimer, the term of this patent is extended or adjusted under 35 U.S.C. 154(b) by 481 days.

(21) Appl. No.: 12/919,593

(22) PCT Filed: Feb. 26, 2009

(86) PCT No.: PCT/IB2009/000487
§ 371 (c)(1),
(2), (4) Date: Aug. 26, 2010

(87) PCT Pub. No.: WO2009/106983
PCT Pub. Date: Sep. 3, 2009

(65) Prior Publication Data
US 2011/0040411 A1  Feb. 17, 2011

(30) Foreign Application Priority Data
Feb. 27, 2008 (JP) .................. 2008-046857

(51) Int. Cl.
*G05B 15/00* (2006.01)
*G05B 19/00* (2006.01)
*G05B 9/02* (2006.01)
*G05B 19/19* (2006.01)
*B25J 9/18* (2006.01)

(52) U.S. Cl.
USPC .......... 700/260; 318/566; 318/568.11; 901/2; 901/45

(58) Field of Classification Search
USPC ................. 318/568.1–568.25, 563, 566–567; 700/159–195, 245–264; 901/2, 45
See application file for complete search history.

(56) References Cited

U.S. PATENT DOCUMENTS

| | | | | |
|---|---|---|---|---|
| 4,403,281 A | * | 9/1983 | Holmes et al. | 700/193 |
| 5,503,241 A | * | 4/1996 | Hiraiwa | 180/446 |
| 5,508,919 A | * | 4/1996 | Suzuki et al. | 701/41 |
| 5,834,917 A | | 11/1998 | Yasui et al. | |

(Continued)

FOREIGN PATENT DOCUMENTS

| | | |
|---|---|---|
| JP | 2005-028492 A | 2/2005 |
| JP | 2006-024150 A | 1/2006 |

(Continued)

*Primary Examiner* — Khoi Tran
*Assistant Examiner* — Abby Lin
(74) *Attorney, Agent, or Firm* — Kenyon & Kenyon LLP

(57) ABSTRACT

A control method for a power assist device provided with an operation handle, a force sensor that detects an operation force applied to the operation handle and an orientation of the operation force, a robot arm, and an actuator. When the orientation of the operation force is detected to be within a predetermined angle range with respect to a preset advancing direction of the operation handle, the actuator is controlled so as to move the operation handle along the advancing direction by employing only a component of the operation force along the advancing direction; and when the orientation of the operation force is detected to be outside the predetermined angle range, the actuator is controlled to move the operation handle by the operation force applied to the operation handle and the orientation of the operation force.

12 Claims, 10 Drawing Sheets

(56) References Cited

U.S. PATENT DOCUMENTS

| | | | |
|---|---|---|---|
| 5,952,796 A * | 9/1999 | Colgate et al. | 318/1 |
| 6,204,620 B1 | 3/2001 | McGee et al. | |
| 7,185,774 B2 * | 3/2007 | Colgate et al. | 212/331 |
| 2003/0135303 A1 | 7/2003 | Arai et al. | |
| 2004/0182640 A1 * | 9/2004 | Katou et al. | 180/446 |
| 2010/0121232 A1 * | 5/2010 | Sankai | 601/23 |
| 2010/0301539 A1 * | 12/2010 | Murayama | 269/74 |

FOREIGN PATENT DOCUMENTS

| | | |
|---|---|---|
| JP | 2006-218573 A | 8/2006 |
| JP | 2006-247794 A | 9/2006 |
| JP | 2007-038059 A | 2/2007 |
| JP | 2007-038314 A | 2/2007 |

\* cited by examiner

100

POWER ASSIST DEVICE AND CONTROL METHOD THEREFOR

This is a 371 national phase application of PCT/IB2009/000487 filed 26 Feb. 2009, claiming priority to Japanese Patent Application No. 2008-046857 filed 27 Feb. 2008, the contents of which are incorporated herein by reference.

BACKGROUND OF THE INVENTION

1. Field of the Invention

The invention relates to a power assist device, and more particularly to a power assist device that guides an advancing direction when a work is conveyed and to a control method for the power assist device.

2. Description of the Related Art

Within the framework of the related technology, robots called power assist devices have been used in production plants to reduce the operator's labor and increase operability. As a technique relating to power assist devices, there is a conventional technique of driving a motor of an arm supporting a work so that, for example, when the work protrudes from a set area, which has been set in advance, during conveying, a return force received from a virtual wall called "an invisible wall" is provided to the operator (for example, see Japanese Patent Application Publication No. 2005-28492 (JP-A-2005-28492)).

As an application example of a power assist device in a production plant, a power, assist device in which an operation member operated by an operator is installed at a distal end of a robot arm performing the assist and a force assisting the operator's operation is generated in the robot arm is used for highly accurate work alignment and operations requiring accuracy of advancing direction during fitting, for example, when a window glass is fitted into an automobile body.

However, with the technology described in JP-A-2005-28492, the work trajectory that serves as a reference during conveying cannot be easily changed or modified. As a result, for example, where such a technology is applied to the above-described operation of fitting a window glass in an automobile body, the following drawbacks are encountered when the body and window glass are displaced even if slightly from a teaching set area: (1) an up-stopper of the window glass is not appropriately inserted into an engagement hole of the body and hits the body, and (2) the glass hits a trunk or the body when the window glass is inserted in the gap between the trunk and the body. Yet another drawback is that when the teaching set area is changed, time is required for changing the set area.

Furthermore, the following specific problems arise when the technology described in JP-A-2005-28492 is applied to an operation in which window glass covered with an urethane adhesive (reference numeral 12 in FIG. 4) is positioned in the direction other than the vertical direction at a certain height above the body so as to prevent the adhesive from adhering to the body, and the window glass is then lowered, while maintaining the position thereof: (1) high accuracy of conveying direction is required because the gap between the trunk and body and the orientation of the stopper for inserting into the holes of the body are determined according to the work structure; (2) when a force is applied to move an operation handle, the force is also applied in the direction in which the work is not intended to be moved, the work moves in this direction, the position thereof is displaced, and the insertion orientation is changed; (3) because of a spread in body positions between the fitting cycles, the set teach position has to be changed, and when the teaching set area is changed, the conveying mode and a mode of changing the set area have to be switched.

Furthermore, where an operation of fitting a window glass into an automobile body is performed without applying the technology described in JP-A-2005-28492, that is, where an operation of fitting the window glass 2 into the body 100 is performed by an operator, while the window glass is being moved by the power assist device of related technology, as shown in FIG. 10, when the operator performs the operation of the robot arm providing the assist with an operation member, the robot arm can be moved in the same manner in any direction, and even if the front and rear positions of the window glass 2 are aligned in a space above the automobile body 100 in this state, the window glass can shift forward or rearward as it is being lowered in the direction shown by a dot-line arrow in FIG. 10. Accordingly, a means is desired for lowering the window glass straight down with good stability, while maintaining the alignment of the upper position.

SUMMARY OF THE INVENTION

It is an object of the invention to provide a power assist device that performs control such that when a work is aligned with a target, the unintentional movement of the hands can be corrected and the work can be easily moved along the target trajectory, and when the trajectory is changed or modified, the work can be moved smoothly.

The first aspect of the invention relates to a control method for a power assist device having an operation section to be operated by an operator, operation force detection means for detecting an operation force applied to the operation section and an orientation of the operation force, a robot arm that supports the operation section, and drive means for driving the robot arm. The control method includes: when an angle formed by the orientation of the operation force applied to the operation section detected by the operation force detection means and a preset advancing direction of the operation section is within a predetermined angle range, controlling the drive means so as to move the operation section along the advancing direction; and when the angle formed by the orientation of the operation force applied to the operation section detected by the operation force detection means and the advancing direction is outside the predetermined angle range, controlling the drive means so as to move the operation section along the orientation of the applied operation force.

With such a configuration, when the work is conveyed to the target, the unintentional movement of the hands can be corrected, and when the trajectory change and modification are performed, the work can be moved smoothly.

In the control method according to the above-described aspect, the predetermined angle range may be divided into a first angle range on the advancing direction side and second angle ranges positioned on both outer sides of the first angle range, the drive means may be controlled so as to move the operation section along the advancing direction when an angle formed by the orientation of the operation force applied to the operation section detected by the operation force detection means and the advancing direction is within the first angle range, and the drive means may be controlled so as to move the operation section in a direction determined by the advancing direction component of the operation force applied to the operation section and a corrected perpendicular direction component that is corrected to become less than a component of the operation force applied to the operation section in the direction perpendicular to the advancing direction when the angle formed by the orientation of the operation force applied to the operation section detected by the operation force detection means and the advancing direction is within the second angle range.

With the above-described configuration, when the work is conveyed to the target, the unintentional movement of the hands can be corrected, and when the trajectory change and modification are performed, the work can be moved smoothly without a sense of discomfort.

In the control method according to the above-described aspect, the second angle range may be divided into a plurality of angle ranges, and the corrected perpendicular direction component may be gradually increased as the angle formed by the orientation of the operation force applied to the operation section detected by the operation force detection means and the advancing direction is contained in an outermore angle range of the plurality of angle ranges.

With the above-described configuration, when a work is conveyed to the target, the unintentional movement of the hands can be corrected, and when the trajectory change and modification are performed, the work can be moved smoothly without a sense of discomfort.

In the control method according to the above-described aspect, the corrected perpendicular direction component may be changed correspondingly to the movement speed of the work.

In the control method according to the above-described aspect, the corrected perpendicular direction component may be changed correspondingly to the magnitude of the operation force applied to the operation section.

In the control method according to the above-described aspect, the preset advancing direction of the operation section may be a vertical downward direction.

In the control method according to the above-described aspect, the control method may be performed repeatedly at predetermined intervals.

The second aspect of the invention relates to a power assist device having an operation section to be operated by an operator, operation force detection means for detecting an operation force applied to the operation section and an orientation of the operation force, a robot arm that supports the operation section, drive means for driving the robot arm, and a control unit for controlling the drive means. The control unit may control, when an angle formed by the orientation of the operation force applied to the operation section detected by the operation force detection means and a preset advancing direction of the operation section is within a predetermined angle range, the drive means so as to move the operation section along the advancing direction, and control, when the angle formed by the orientation of the operation force applied to the operation section detected by the operation force detection means and the advancing direction is outside the predetermined angle range, the drive means so as to move the operation section along the orientation of the applied operation force.

With the above-described configuration, when the work is conveyed to the target, the unintentional movement of the hands can be corrected, and when the trajectory change and modification are performed, the work can be moved smoothly.

In the power assist device according to the above-described aspect, the predetermined angle range is divided into a first angle range on an inner side and second angle ranges positioned on both outer sides of the first angle range, and the control unit may control, when an angle formed by the orientation of the operation force applied to the operation section detected by the operation force detection means and the advancing direction is within the first angle range, the drive means so as to move the operation section along the advancing direction, and may control, when the angle formed by the orientation of the operation force applied to the operation section detected by the operation force detection means and the advancing direction is outside the second angle range, the drive means so as to move the operation section in a direction determined by an advancing direction component of the operation force applied to the operation section and a corrected perpendicular direction component that is corrected to become less than a component of the operation force applied to the operation section in the direction perpendicular to the advancing direction.

With the above-described configuration, when the work is conveyed to the target, the unintentional movement of the hands can be corrected, and when the trajectory change and modification are performed, the work can be moved smoothly without a sense of discomfort.

In the power assist device according to the above-described aspect, the second angle range may be divided into a plurality of angle ranges, and the corrected perpendicular direction component may be gradually increased as the angle formed by the orientation of the operation force applied to the operation section detected by the operation force detection means and the advancing direction is contained in an outermore angle range of the plurality of angle ranges.

With the above-described configuration, when the work is conveyed to the target, the unintentional movement of the hands can be corrected, and when the trajectory change and modification are performed, the work can be moved smoothly without a sense of discomfort.

In the power assist device according to the above-described aspect, the corrected perpendicular direction component may be changed correspondingly to the movement speed of the work.

In the power assist device according to the above-described aspect, the corrected perpendicular direction component may be changed correspondingly to the magnitude of the operation force applied to the operation section.

In the power assist device according to the above-described aspect, the preset advancing direction of the operation section may be a vertical downward direction.

In the power assist device according to the above-described aspect, the control of the drive unit by the control unit may be performed repeatedly at predetermined intervals.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
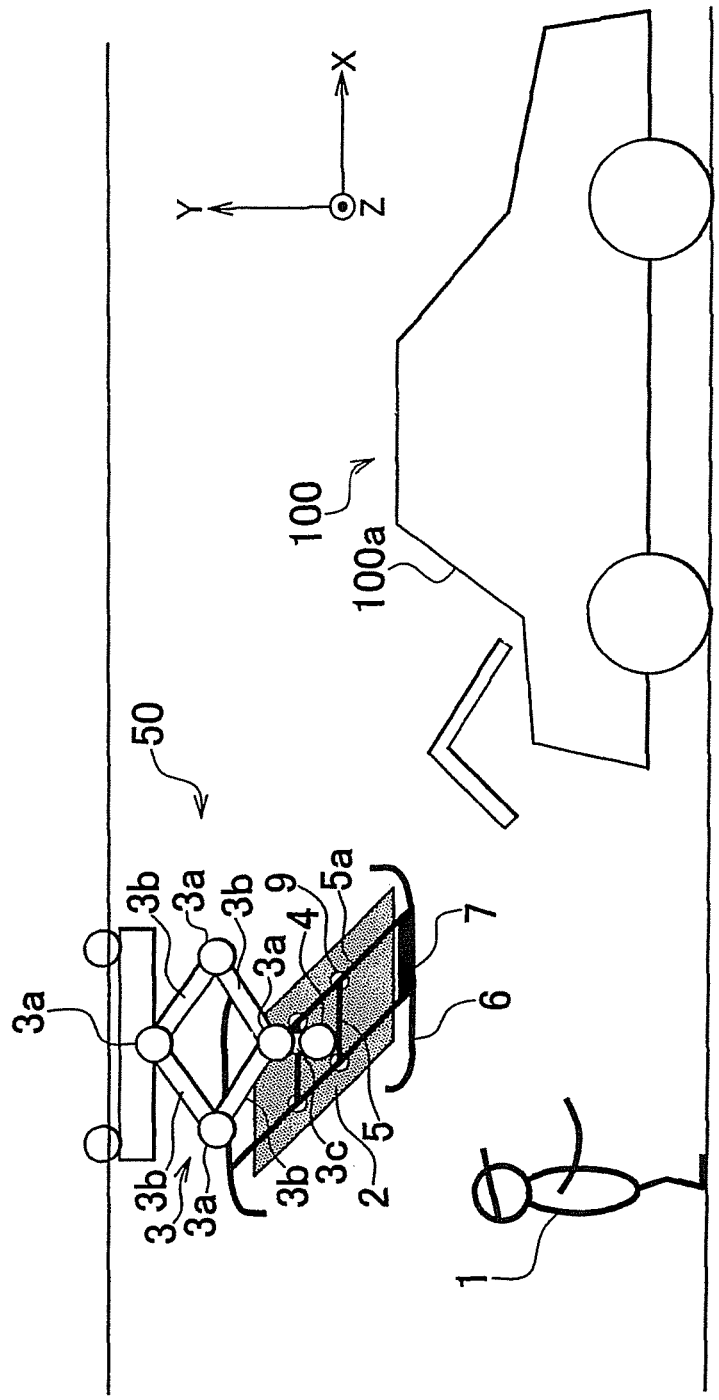
FIG. 1 is a schematic diagram illustrating the entire configuration of a power assist device of an embodiment of the invention.
Figure 2:
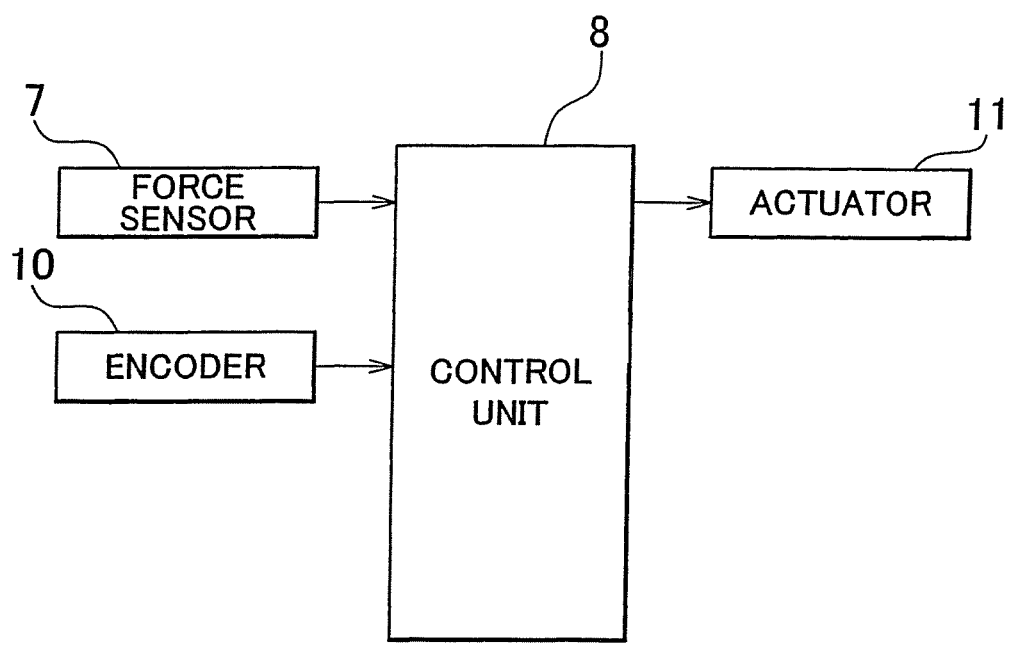
FIG. 2 is a block diagram illustrating the configuration of a control system of the power assist device of the embodiment of the invention.
Figure 3:
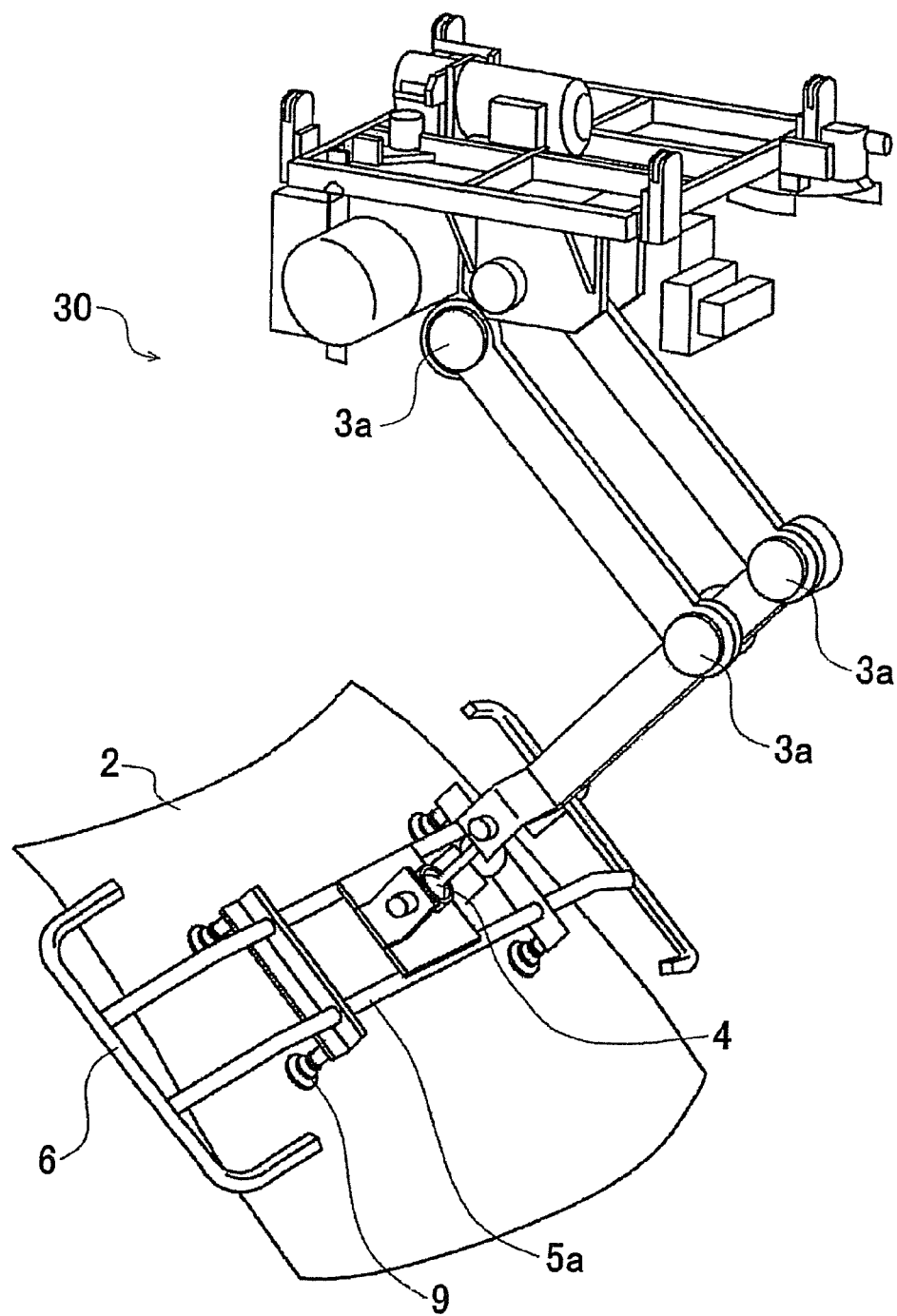
FIG. 3 is a perspective view illustrating another example of a robot arm in the power assist device.
Figure 4:
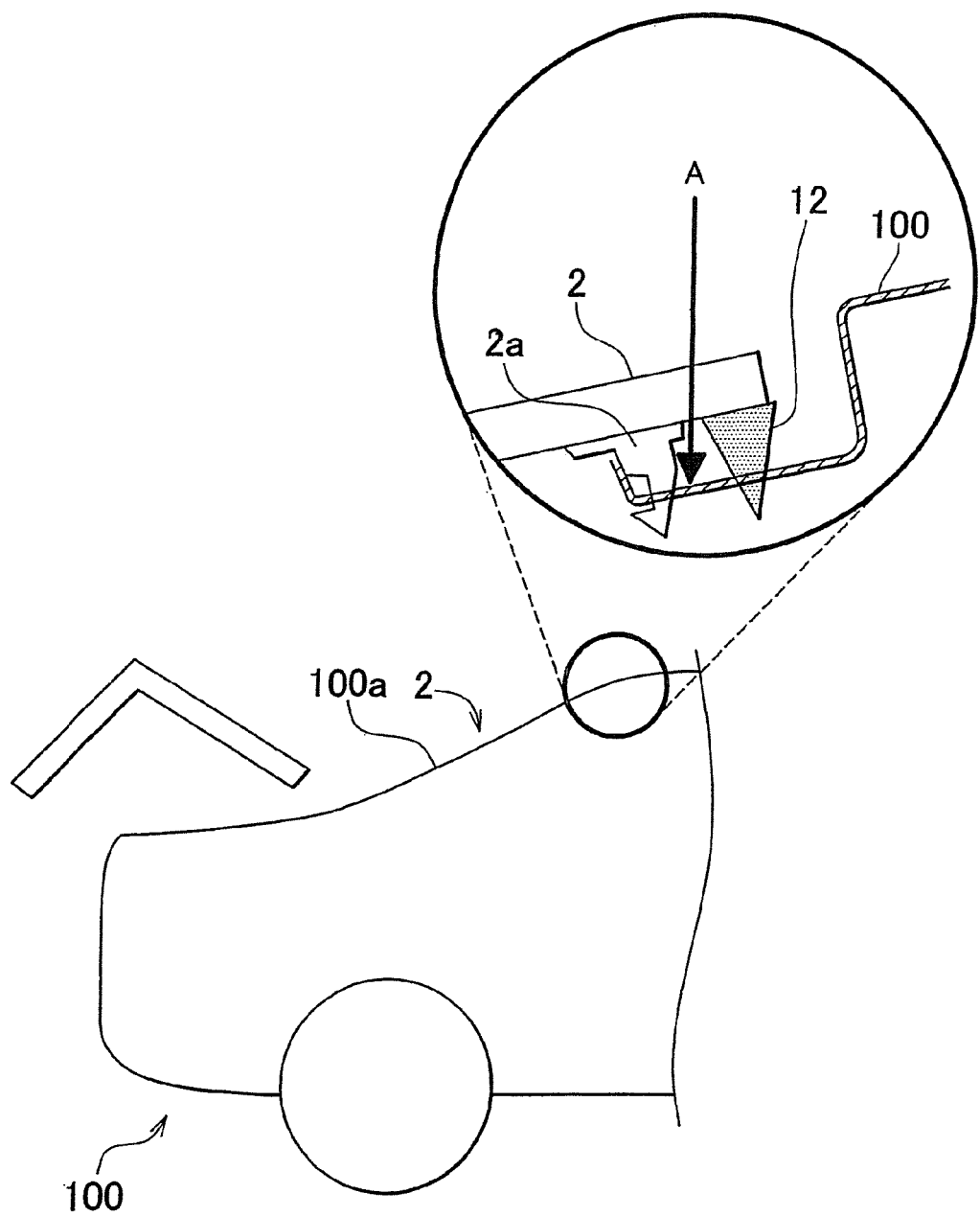
FIG. 4 is a schematic diagram illustrating an enlarged upper end portion of window glass in a state after fitting the window glass of the embodiment of the invention into a body.
Figure 5:
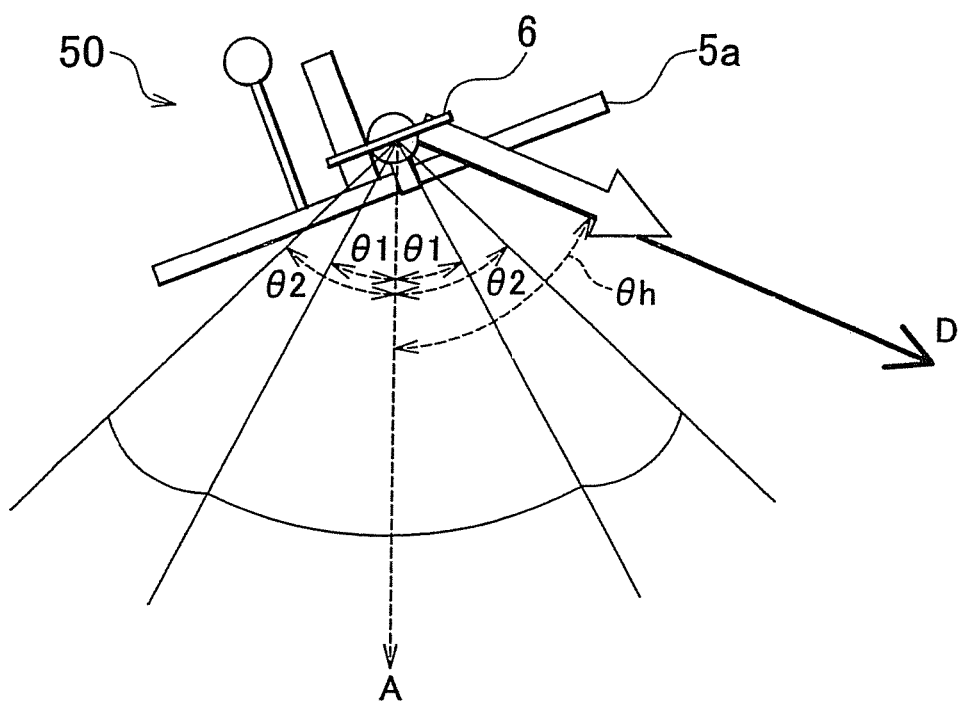
FIG. 5 illustrates the relationship between a predetermined angle range and the orientation of an operation force in the embodiment of the invention.
Figure 6:
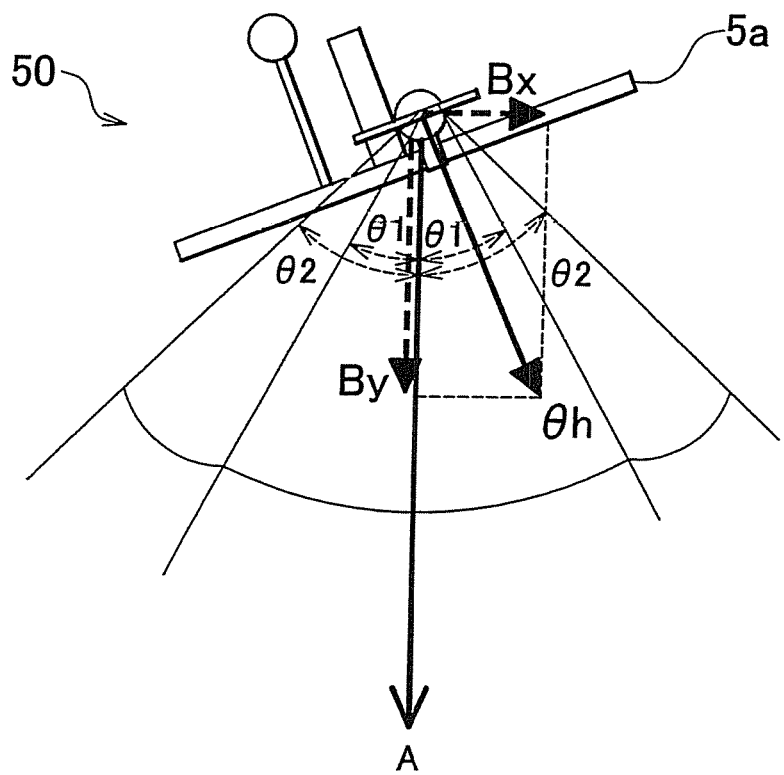
FIG. 6 illustrates the relationship between a predetermined angle range and the orientation of an operation force in the embodiment of the invention.
Figure 7:
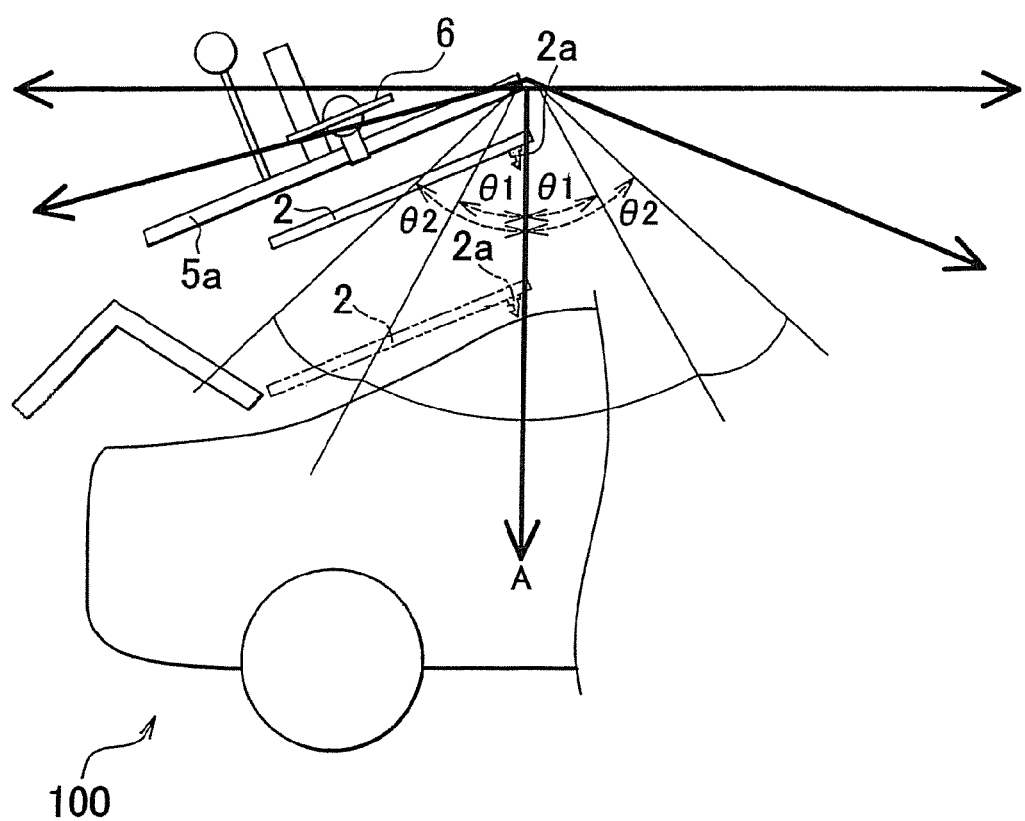
FIG. 7 illustrates the relationship between a predetermined angle range and the orientation of an operation force in the embodiment of the invention.
Figure 9:
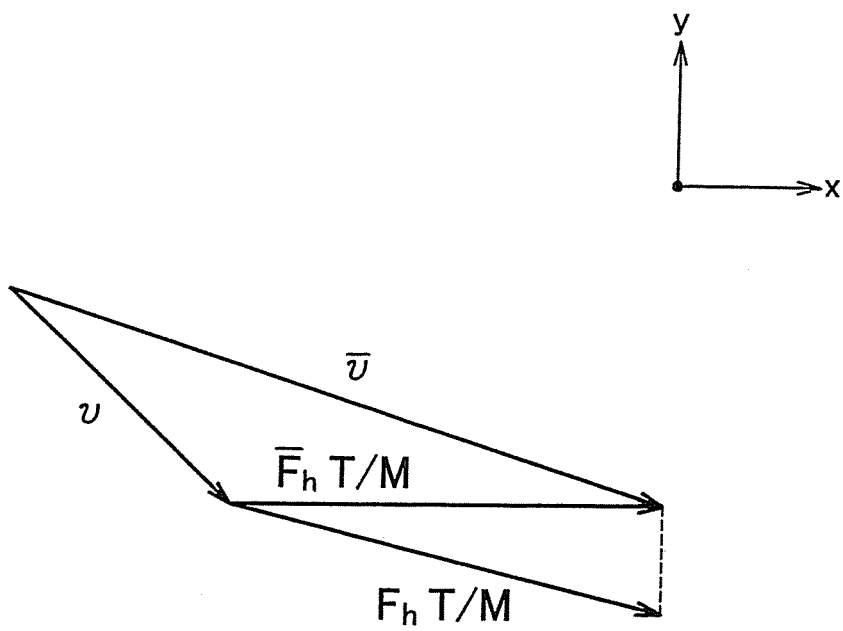
FIG. 9 is a vector diagram of operation force correction in the embodiment of the invention.
Figure 10:
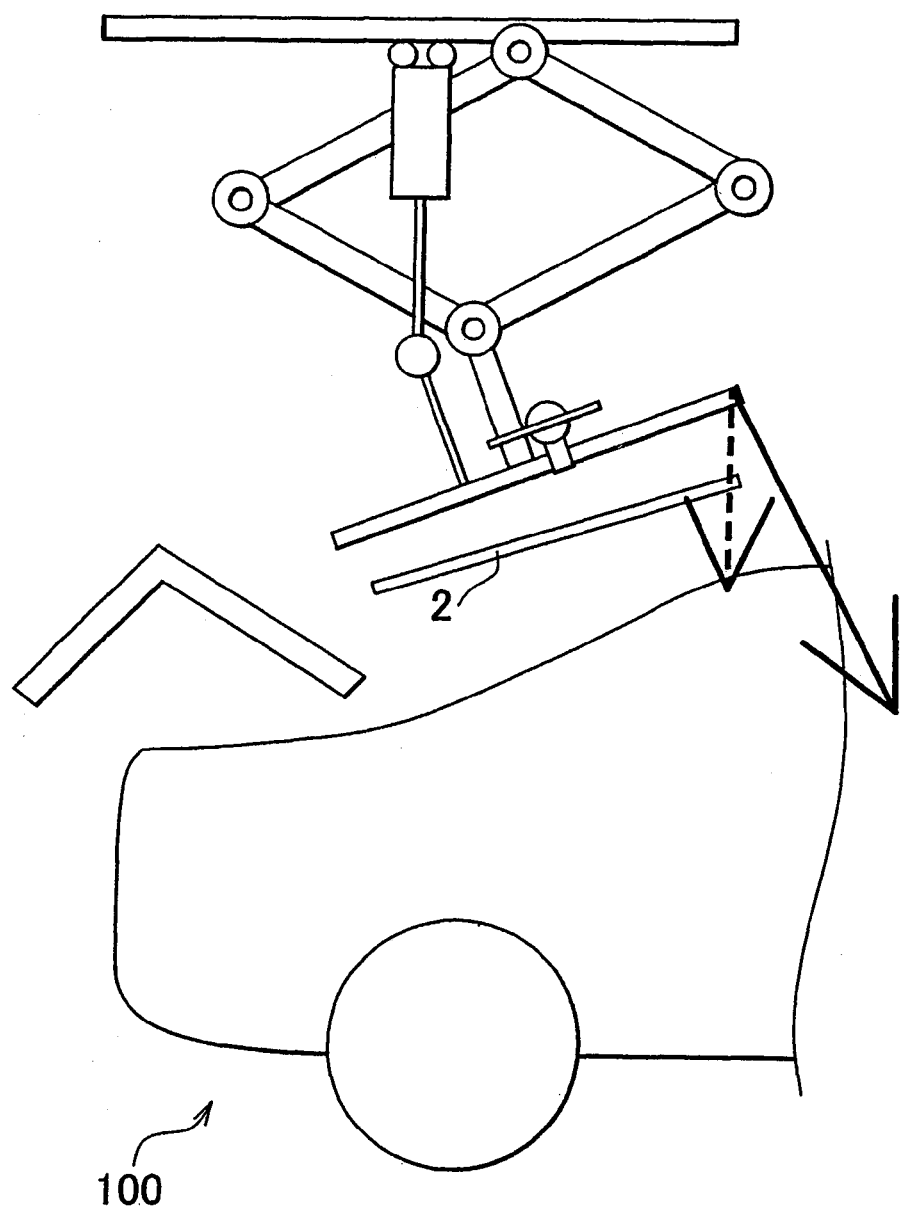
FIG. 10 is a schematic diagram illustrating a window glass fitting operation performed with a power assist device of the related art.

An embodiment of the invention will be described below. FIG. 1 is a schematic diagram illustrating the entire configuration of a power assist device of an embodiment of the invention. FIG. 2 is a block diagram illustrating the configuration of a control system of the power assist device. FIG. 3 is a perspective view illustrating another example of a robot arm in the power assist device. FIG. 4 is a schematic diagram illustrating an enlarged upper end portion of window glass in a state after fitting the window glass of the embodiment of the invention into a body. FIG. 5 illustrates the relationship between a predetermined angle range and the orientation of an operation force. FIG. 6 illustrates the relationship between a predetermined angle range and the orientation of an operation force in the embodiment of the invention. FIG. 7 illustrates the relationship between a predetermined angle range and the orientation of an operation force in the embodiment of the invention. FIG. 8 is an explanatory drawing illustrating an embodiment of a guide direction and an angle. FIG. 9 is a vector diagram of operation force correction. FIG. 10 is a schematic diagram illustrating a window glass fitting operation performed with a power assist device of the related art. In the present embodiment, in order to facilitate the understanding, an operation will be explained by way of example in which a work that is a conveying object is moved in an XY plane of an XYZ coordinate system shown in FIG. 1. The XY plane is a vertical plane. Furthermore, in the explanation below, the direction of arrow X shown in FIG. 1 will be taken as a forward direction for convenience of explanation. Moreover, in the present embodiment the main operation performed by an operator 1 is an operation of fitting a window glass 2 (referred to hereinbelow as window 2) which is the work that is moved from above a window frame 100a of an automobile body 100 shown in FIG. 1 to a fitting position of the window 2 in a window frame 100a and fitted.

First, the entire configuration of the power assist device of an embodiment of the invention will be described. As shown in FIG. 1, a power assist device 50 mainly includes a robot arm 3, which is an example of a robot, a joint 4, an attachment jig 5 that is a holding means of the window 2 supported by the robot arm 3 via the joint 4, an operation handle 6 that is an operation section provided at the attachment jig 5 and operated by the operator 1, a force sensor 7 that is an operation force detection means for detecting the operation force applied to the operation handle 6 and the orientation of the operation force, an actuator 11 that drives the robot arm 3, and a control unit 8 (shown in FIG. 2) that drive controls the actuator 11.

The robot arm 3 is configured by a closed-loop link mechanism of a pantograph shape, as shown in a side view in FIG. 1, and has a plurality of links 3b, 3b, 3b, and 3b linked via a plurality of nodes 3a (four in the present embodiment). A tool 3c that is the distal end of the robot arm 3 is joined to the attachment jig 5 that attaches the window 2 via the joint 4. The joint 4 enables three-dimensional swinging of the posture of the window 2 attached to the attachment jig 5. Furthermore, the nodes 3a, joint 4, and links 3b, 3b, 3b, and 3b constitute a link mechanism. The actuator 11 (shown in FIG. 2) is attached to the link mechanism, the link mechanism can be driven by driving the actuator 11 and the tool 3c of the robot arm 3 can swing three dimensionally. As a result, the attachment jig 5, which is joined via the joint 4 to the robot arm 3, can swing three dimensionally with respect to the robot arm 3. As for the robot arm 3, in the case of usual conveying, when the operator 1 rotates the window 2 about a yaw axis and a roll axis by the operation handle 6, the operator can move the tool 3c of the robot arm 3 and move the window 2 in the transverse direction (left-right direction in FIG. 1) and the vertical direction (up-down direction in FIG. 1), respectively. In other words, the operator 1 can grasp the operation handle 6 and move the window 2 in the direction of tilting the attachment jig 5. In the present embodiment, as shown in FIG. 1, the power assist device 50 is explained which is equipped with a robot arm 3 of a pantograph shape in a side view thereof, but this configuration is not limiting, and the robot arm may also be a robot arm 30 that is a manipulator-type multimode robot such as shown in FIG. 3. In the robot arm 30 shown in FIG. 3, locations having members and functions identical to those of the above-described robot arm 3 are assigned with identical reference numerals.

Furthermore, an encoder 10 (see FIG. 2) that is an angle detection means for detecting the positions of links 3b, 3b, 3b, and 3b as angles is disposed in nodes 3a, 3a, 3a, and 3a and the joint 4 of the robot arm 3. The detection value obtained with the encoder 10 is set to the control unit 8. The control unit 8 can determine the position of the window 2 and the posture of the window 2 from the detection value sent from the encoder 10.

The attachment jig 5 is provided with a frame 5a, which is a frame assembly of the attachment jig 5, and operation handles 6, 6 that extend to the left and right sides of the frame 5a (both sides with respect to arrow X representing the line advancing direction), can be grasped by the operator 1, and serve to operate the attachment jig 5. Furthermore, the attachment jig 5 is suspended at the tool 3c of the robot arm 3 via the joint 4 and can attach and hold the window 2. More specifically, a plurality (four in the present embodiment) of suction plates 9 that are attached by suction to the surface (in other words, the surface that is on the outer side of the body 100 when the window 2 is attached to the body 100) of the window 2 are provided at the lower end of the frame 5a. When the window 2 is held by the attachment jig 5, the suction plates 9 are brought into intimate contact with the surface of window 2 and the air located inside the suction plates 9 is sucked in by a pump (not shown in the figure). As a result, the window 2 is attached by suction to the suction plates 9 and held by the attachment jig 5. When the window 2 is released from the attachment jig 5, suction of air by the pump is stopped and air is injected between the suction plates 9 and the window 2, thereby terminating the attachment of window 2 by suction to the suction plates 9. As a result, the window 2 is released from the attachment jig 5.

As shown in FIG. 1, the operation handles 6 have an almost U-like shape in a plan view and disposed at both ends of the attachment jig 5. Furthermore, the aforementioned force sensor 7 is disposed in the vicinity of the central portion in the transverse direction of one end (side where the operator 1 grasps the handle) of the operation handle 6. The operation handle 6 is grasped by the operator 1 when the window 2 is fitted into a window frame 100a of the body 100. When the operator 1 grasps the handle 6, the attachment jig 5 is stabilized and the operator 1 can align the window 2 against the window frame 100a.

The force sensor 7 is disposed between the handle 6 and the frame 5a of the attachment jig 5 and detects the operation force applied to the handle 6 and the orientation of the operation force. In other words, this sensor serves to detect an operation force and a torque applied to the window 2 by the operator 1 that operates in cooperation with the power assist device 50. Furthermore, the operation force of the operator 1 and the orientation of the operation force that are detected by the force sensor 7 are sent to the below-described control unit 8. In the present embodiment, the force sensor 7 is installed only on one handle 6, but such a configuration is not limiting and the force sensors may be installed in the vicinity of both handles 6.

As shown in FIG. 2, the above-described force sensor 7, encoder 10, and actuator 11 driving the robot arm 3 are connected to the control unit 8. The operation of each unit of the power assist device 50 is controlled by the control unit 8. The intention of the operator 1 (in the present embodiment, the intention to move the window 2 down for fitting) is estimated in real time on the basis of the operation force and orientation of the operation force detected by the force sensor 7, position information of the attachment jig 5 (window 2) based on the encoder 10, and the like. Furthermore, the control unit 8 drives the actuator 11 to control the robot arm 3 and generates the assist force determined correspondingly to the orientation of the below-described operation force applied by the operator 1.

The control unit 8 is composed of a central processing unit (CPU), a memory device (hard disk device, RAM, or ROM), an interface, and the like (not shown in the figure) and stores in the memory device information of various types for determining the conditions for drive controlling the actuator 11 on the basis of a relationship between the below-described operation force, orientation θh thereof, and target trajectory A. Furthermore, the control unit 8 has a command value calculation unit and a command value output unit that are not shown in the figure.

A method for controlling the power assist device of an embodiment of the invention will be described below with reference to FIGS. 4 to 7. First, an advancing direction of the operation handle 6 or the tool 3c of the robot arm 3 (in the present embodiment, the advancing direction of the operation handle 6) is set in advance in the control unit 8. The advancing direction A of the operation handle 6 that has thus been set in advance is a target trajectory. A of the operation handle 6. In the present embodiment, a vertical downward direction (direction of arrow A in FIG. 4), is present in the control unit 8 as the advancing direction A of the operation handle 6, so that a hook-like up-stopper 2a located at the upper end portion of the window 2 shown in FIG. 4 engages with an engagement hole of an up-stopper 2a provided in a predetermined position of the body 100. Then, as shown in FIG. 5, condition setting of a predetermined angle range is performed with reference to the advancing direction A (target trajectory A). Here, the angles between the angle range boundaries with respect to the advancing direction A shown by a dot-like arrow in FIG. 5 are represented by θ1 and θ2 (in the present embodiment, θ1=20° and θ2=30°. The angle range represented by θ1 is an angle range in which control is so performed that the operation handle 6 does not move obliquely at all with respect to the advancing direction A where the orientation θh of the operation force applied to the operation handle 6 satisfies the condition within this angle range (θ1≥θh). The angle range that is an area obtained by subtracting the θ1 angle range from the θ2 angle ranges positioned at both sides further outside the angle range in which absolutely no oblique movement is made is an angle range in which control is so performed that it is difficult for the operation handle 6 to move obliquely with respect to the advancing direction A when the orientation θh of the operation force applied to the operation handle 6 satisfies the condition within this angle range (θ1<θh≤θ2).

Furthermore, the angle range outside the angle range in which oblique movement is made difficult is an angle range in which control is so performed that the operation handle 6 is moved forward by the operation force applied to the operation handle 6 and according to the orientation θh of the operation force where the orientation θh of the operation force applied to the operation handle 6 satisfies the condition within this angle range (θ2<θh). Thus, the respective angle ranges and respective control flows relating to the cases in which the operation force orientation corresponds to the angle range are stored in the control unit 8, the operation force applied by the operator 1 and the orientation θh thereof are detected by the force sensor 7, and the control unit 8 performs drive control of the actuator 11 on the basis of the relationship between the detected operation force and orientation θh thereof and the above-described angle range. As described hereinabove, the advancing direction A of the operation handle 6 is stored in the control unit 8, but this configuration is not limiting, and it is also possible to store the advancing direction of the tool 3c of the robot arm 3 (target trajectory of the tool 3c) or the advancing direction of the window 2 that is a work (target trajectory of the work) and employ these advancing directions as reference directions for measuring the orientation θh of the operation force.

As shown in FIG. 5, when the orientation θh of the operation force is detected by the force counter 7 to be outside the angle range (angle range outside θ2; θ2<θh) in which it is difficult for the operation handle 6 to move obliquely with respect to the advancing direction A, the orientation θh of the operation force becomes the advancing direction D of the operation handle 6. More specifically, the control unit 8 directly employs the operation force applied to the operation angle 6 and the orientation θh of the operation force and drives the actuator 11 so as to move the operation handle 6 forward. In other words, the orientation θh of the operation force that enters an angle range outside θ2 is a direction in which the operation handle 6 freely moves.

As shown in FIG. 6, when the orientation θh of the operation force is detected by the force sensor 7 to be within the angle range (θ1≥θh) in which the operation handle 6 absolutely cannot move obliquely with respect to the advancing direction A (the case in which the orientation θh of the operation force of the operation handle 6 shown in FIG. 6 satisfies the condition: θ1≥θh), the component of the operation force that is perpendicular to the preset advancing direction A (arrow Bx in FIG. 6) is ignored (canceled) and becomes zero, only the component in the up-down direction (arrow By in FIG. 6), which is parallel to the advancing direction A, is considered to be effective, and the operation handle 6 is moved along the advancing direction A. Thus, the control unit 8 employs only the components of the operation force applied to the operation handle 6 and the orientation θh of the operation force in the advancing direction A and drives the actuator 11 so as to move the operation handle 6. Thus, by applying the control method for the power assist device 50 of this embodiment of the invention, it is possible to perform the control that guide assists the operation handle 6 along the advancing direction A and to transport the window 2, which is a work, smoothly to the predetermined position.

In the operation of fitting the up-stopper 2a of the window 2 in the body 100, which causes problems within the framework of related technology, where the advancing direction A that becomes a vertical downward direction of the up-stopper 2a after the up-stopper 2a has been aligned with the engagement hole is preset, as shown in FIG. 7, the advancing direction A becomes an orientation that controls the operation handle 6 to prevent the displacement thereof. Thus, where the operation force is applied with the orientation θh within a predetermined angle range (here within the angle range θ1 in which absolutely no oblique movement is performed) with respect to the advancing direction A (target trajectory A), the orientation is forcibly corrected to a regulated orientation (in the present embodiment, the advancing direction A that is a vertical downward direction), and the operation handle 6 is controlled by the control unit 8 so that the operation handle can move only in the regulated direction. Furthermore, when the operation handle 6 is regulated as described hereinabove and moves along the advancing direction A, if the operator 1 intentionally applies an operation force with the orientation θh of the operation force to the operation handle 6, such that is outside the angle range in which the oblique movement is made difficult (angle range on both sides outside θ2), then the orientation of the advancing direction A is not regulated and the operation handle comes off the target trajectory A and moves freely. Thus, the window 2 can be lowered by guiding in the advancing direction, without displacing upper end portion of the window 2 that has been aligned before the window 2 is fitted into the body 100 and the window 2 can be guided in the desired direction and fitted into the engagement hole. As a result, the alignment accuracy and advancing direction accuracy are improved and operation time is shortened.

In the present embodiment, a vertical downward direction is taken as a present advancing direction A in order to facilitate the understanding of the invention, but in a production plant, it is necessary to accommodate to various directions, the direction that has to be controlled is not particularly limited, and the advancing direction (target trajectory) corresponding an appropriate state may be set in the control unit 8. Furthermore, the preset advancing direction A (target trajectory A) may be freely set as a straight line, a zigzag, or a curve in a three-dimensional space, rather than only on a two-dimensional plane, and even a very complex advancing direction can be easily set in the control unit 8.

The setting of the above-described angle ranges is not particularly limited. For example, when the orientation θh of the operation force is within a predetermined angle range with respect to the advancing direction A, the control may be performed by employing only the component of the operation force along the advancing direction, and when the orientation θh of the operation force is outside a predetermined angle range with respect to the advancing direction A, the control may be performed by employing the applied operation force and the orientation thereof. In other words, in the control method for the power assist device 50 of the embodiment of the invention, a means is provided for regulating the trajectory so that the window 2, which is a work, moves along the target trajectory A if the orientation θh of the operation force is within a predetermined angle with respect to the advancing direction A (target trajectory A), and when the target trajectory exceeds the predetermined angle, the regulation with this regulating means is not performed.

Furthermore, the predetermined angle range is divided into an inner first angle range and a second angle range positioned on both sides outside the first angle range, and when the orientation θh of the operation force is within the first angle range, only the component of the operation force along the advancing direction is employed. When the orientation θh of the operation force is within the second angle range, as described above, an angle range is assumed in which the control is so performed that, as described above, it is difficult for the operation handle 6 to move obliquely. More specifically, in order to make the oblique movement difficult, the actuator 11 is drive controlled by employing an advancing direction component of the operation force applied to the operation handle 6 and a perpendicular component that is corrected to be smaller than the component of the operation force applied to the operation handle 6 that is perpendicular to the advancing direction. In other words, the control unit 8 drives the actuator 11 so that the operation handle 6 is moved in the direction determined by the advancing direction component of the operation force applied to the operation handle 6 and the corrected perpendicular component of the operation force.

Furthermore, a configuration may be employed in which the inside of the above-described second angle range (inside of the angle range in which the oblique movement is difficult) is further divided into a plurality of angle ranges and the cancelation amount of the operation force shown by arrow Bx in FIG. 6 is gradually relaxed (reduced) with the transition to the outer angle range. Thus, in this configuration, the operation force after the correction of the perpendicular component gradually increases with the transition to an outer angle range from among the plurality of angle range. With such a configuration, even when the operator 1 passes through a boundary between the first angle range (angle range in which oblique movement is impossible) and the second angle range (angle range in which the oblique movement is difficult), the operator does not feel the boundary. In other words, it is possible to withdraw from the target trajectory A and return to the target trajectory A in a smooth manner.

A calculation method relating to the control method for the power assist device of the above-described embodiment of the invention will be described below in greater detail by using mathematical formulas. In a calculation unit (not shown in the figure) of the control unit 8, a trajectory obtained by correcting the target trajectory A is calculated based on detection values obtained when the force sensor 7 detected the operation force applied by the operator 1 to the operation handle 6 and the orientation θh of the operation force.

The inventors have studied the angle of unintentional movement of the operation force occurring when the operator 1 moves the tool 3c of the robot arm 3 along the target trajectory A. The result obtained demonstrated that the angle of unintentional movement is generally within ±10 deg. With consideration for individual differences, in the present embodiment, it is supposed that the operator 1 operates along the target trajectory A when the angle of unintentional movement is within ±20 deg and this value is set in the control unit 8. It is also assumed that when the operator 1 operates in the direction outside this range (equal to or more than 20 deg), the trajectory has to be changed and corrected and this is set as a condition in the control unit 8. The angle of unintentional movement is not particularly limited and can be appropriately set depending on the situation.

Figure 8A:
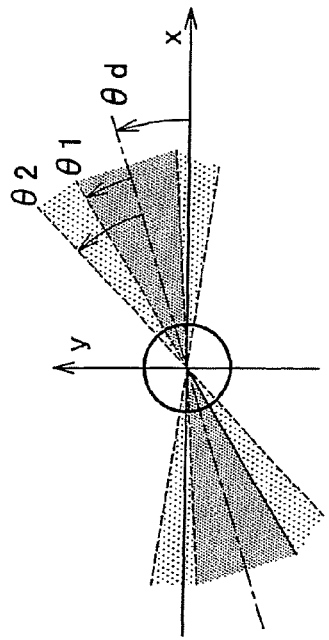
FIGS. 8A to 8D are explanatory drawings illustrating an embodiment of a guide direction and an angle.
Figure 8B:
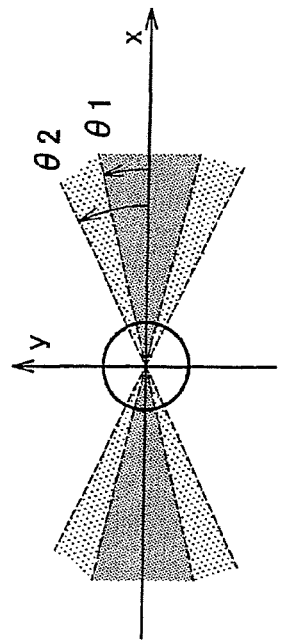
Figure 8C:
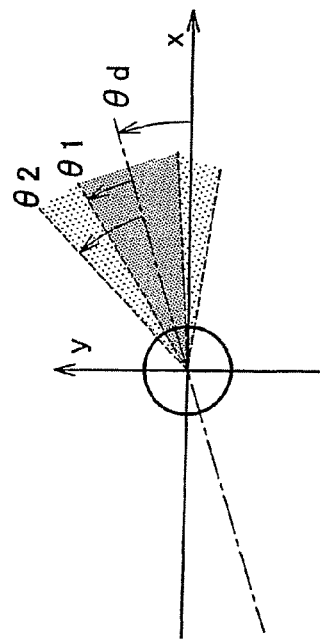
Figure 8D:
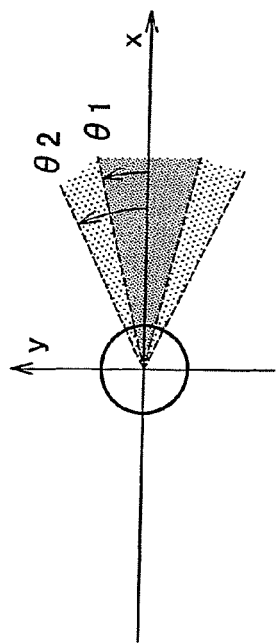

More specifically, an embodiment such as shown in FIGS. 8A to 8D is employed correspondingly to the target direction and correction angle range. In FIG. 8A, the positive-negative direction of the x axis is taken as a target direction. FIG. 8B shows a state with an inclination of θd with respect to that shown in FIG. 8A, FIG. 8C shows a free state in which correction is performed in the positive direction of the x axis, but not performed in the negative direction. FIG. 8D shows a state with an inclination at an angle θd with respect to that in FIG. 8C.

(Correction Method for Operation Force) As shown in FIG. 8A, the direction in which the advance is facilitated by correction of unintentional movement of the hands is taken as the x axis. Where the orientation θh of the operation force is within a range of ±θ1 with respect to the x axis, the y axis component of the operation force is canceled to suppress the unintentional movement of the hands. In the range outside $\pm\theta 2$ with respect to the x axis, the unchanged operation force is used. When the orientation $\theta h$ of the operation force is between $\theta 1$ and $\theta 2$, the cancellation degree of the y axis component is interpolated. A new operation force (Formula 1) is obtained by performing the below-described correction with respect to the y axis component of the original operation force Fh=(Fhx, Fhy).

$$\overline{F}_{hy}(\theta_h) = \begin{cases} 0 & \text{if } |\theta_h| \le |\theta_1| \\ F_{hy}^{\frac{|\theta_h|-|\theta_1|}{|\theta_2|-|\theta_1|}} & \text{if } |\theta_1| < |\theta_h| \le |\theta_2| \\ F_{hy} & \text{if } |\theta_2| < |\theta_h| \end{cases} \quad [\text{Formula 1}]$$

In this case, $\theta h$ is represented by the following equation (Formula 2)

$$\theta_h = \tan^{-1}\frac{F_{hy}}{F_{hx}} \quad [\text{Formula 2}]$$

A corrected operation force represented by the following equation (Formula 3) is obtained.

$$\overline{F}'_h = (F_{hx}, \overline{F}_{hy}) \quad [\text{Formula 3}]$$

In the case of inclination such as shown in FIG. 8B, computation can be performed in the same manner as described above by coordinate conversion with a rotation matrix. The target direction component of the operation force Fh and the component perpendicular thereto are found by multiplying the rotation matrix as shown in the equation below (Formula 4).

$$F'_h = [F'_{hx}, F'_{hy}]^T = R(-\theta_d)F_h \quad [\text{Formula 4}]$$

Here, $R(\theta)$ is a matrix causing rotation through the angle $\theta$. For example, in a two-dimensional form, this matrix is represented by the following equation (Formula 5

$$R(\theta) = \begin{bmatrix} \cos\theta & -\sin\theta \\ \sin\theta & \cos\theta \end{bmatrix} \quad [\text{Formula 5}]$$

The correction computations are performed according to the following equation (Formula 6)

$$\overline{F}'_{hy}(\theta'_h) = \begin{cases} 0 & \text{if } |\theta'_h| \le |\theta_1| \\ F'_{hy}\frac{|\theta_h|-|\theta_1|}{|\theta_2|-|\theta_1|} & \text{if } |\theta_1| < |\theta'_h| \le |\theta_2| \\ F'_{hy} & \text{if } |\theta_2| < |\theta'_h| \end{cases} \quad [\text{Formula 6}]$$

In this case, $\theta'h$ is represented by the following equation (Formula 7).

$$\theta'_h = \tan^{-1}\frac{F'_{hy}}{F'_{hx}} \quad [\text{Formula 7}]$$

A new operation force that is obtained by correction computations and represented by the following equation (Formula 8) is again returned to the original coordinate system by the rotation matrix $R(\theta d)$, as shown by the following formula (Formula 9).

$$\overline{F}'_h = (F'_{hx}, \overline{F}'_{hy}) \quad [\text{Formula 8}]$$

$$\overline{F}_h = R(\theta_d)\overline{F}'_h \quad [\text{Formula 9}]$$

After the operation force has thus been corrected, the usual impedance control computation may be performed and the power assist device 50 may be impedance controlled.

For example, FIG. 9 shows a vector diagram relating to the case in which an operation force Fh acts upon an article moving with a speed v (T is a sampling time, M is a mass). In this case, the article is wished to be moved in the x axis direction. Let us consider the case in which the robot arm 3 moves in the direction of vector v, as shown in FIG. 9. Where the operation force is represented by a vector Fh, the acceleration after one sampling becomes a vector FhT/M shown in FIG. 9. In this case, because the x axis direction is taken as the target trajectory A (advancing direction A), in the operation force after correction, the y direction component is canceled as in a vector of bar FhT/M, and the speed vector in the next sampling eventually becomes a bar v. In this example, the case is considered in which the initial movement direction v has shifted from the target trajectory A, but the above-described computation is a computation in sampling within a very short time, and where such a computation is performed repeatedly, the movement speed vector becomes along the target trajectory A (advancing direction A), and the robot arm 3 moves along the target trajectory A (advancing direction A). Furthermore, when the initial movement direction does not shift from the target trajectory A, the subsequent movement also does not shift from the target trajectory A and the movement proceeds along the target trajectory A (advancing direction A). In the present embodiment, a correction depending on the movement speed is not performed, but a correction amount may be varied correspondingly to the movement speed. Furthermore, it is also possible to vary not only the correction amount, but also the above-described first angle range and second angle range or to vary the correction amount correspondingly to the value of the operation force.

The operation of fitting the window 2 into the window frame 100*a* of the body 100 by cooperation of the robot and operator and the operation of the power assist device 50 in the case the above-described control method is applied to the power assist device 50 of the above-described configuration will be described below.

As shown in FIG. 1, the attachment jig 5 is suspended via the joint 4 at the tool 3*c* serving as a distal end of the robot arm 3, and the window 2 is attached to the attachment jig 5 to fit the window 2 into the window frame 100*a* of the body 100. The operator 1 leads the robot arm 3, while adjusting the position and posture of the window 2, thereby conveying the window 2 to a position above the window frame 100*a*, which is the fitting position. As shown in FIG. 7, the window 2 is positioned practically above the window frame 100*a*. The operator 1 then positions the up-stopper 2*a* provided at the upper end portion of the window 2 vertically above the engagement hole for engaging the up-stopper 2*a*. In this case, if the operator 1 holds the operation handle 6 in this position and applies an operation force in the direction of bringing the window 2 closer to the window frame 100*a*, which is the target position, that is, to the operation handle 6 of the attachment jig 5 having the window 2 attached thereto, then the operation handle 6 will move in the advancing direction A, as shown in FIG. 7, in response to this operation force.

In this case, where the orientation θh of the operation force is detected by the force sensor 7 to be within the predetermined angle range (θ1≥θh) with respect to the predetermined advancing direction A (target trajectory A; downward direction in the present embodiment), the operation handle 6 is moved along the target trajectory A by the component of the detected operation force that is in the advancing direction. As a result, the up-stopper 2a is engaged with the engagement hole. Furthermore, when the operator wishes to cancel the engagement of the up-stopper 2a with the engagement hole in the process of moving the operation handle 6 along the advancing direction A, the operator 1 can intentionally provide the orientation θh of the operation force in the direction outside the predetermined angle range (θ2<θh) to the operation handle 6, withdraw the operation handle from the advancing direction A and freely move the operation handle.

In other words, when the operator 1 inclines the operation handle so as to move the window 2 along the preset target trajectory A, the unintentional movement of the hands of the operator 1 can be corrected and the operation handle 6 can be moved along the target trajectory A, and when the orientation θh of the operation force withdrawn from the predetermined angle range is provided, the operation handle 6 can be moved in the direction identical to the orientation of the operation force.

Because the operator 1 cannot be fully aware of the direction of the operation force applied to the operation handle 6, in some cases the direction of the operation force is not parallel to the XY plane. However, because the force sensor 7 detects only the component of the operation force that is in the direction about the yaw axis that is parallel to the XY plane, the operation force applied by the operator 1 may be not parallel to the XY plane.

Thus, by applying the control method for the power assist device 50 including the operation handle 6, which is an operation section operated by the operator 1, the force sensor 7, which is an operation force detection means for detecting an operation force applied to the operation handle 6 and the orientation θh of the operation force, the robot arm 3 that supports the operation handle 6, and the actuator 11, which is a drive means for driving the robot arm 3, this method for controlling the power assist device 50 including controlling the actuator 11 so as to move the operation handle 6 along the advancing direction A when the orientation θh of the operation force applied to the operation handle that is detected by the force detector 7 is within a predetermined angle range with respect to the advancing direction A of the operation handle 6 that has been set in advance, and controlling the actuator 11 so as to move the operation handle 6 along the orientation θh of the applied operation force when the orientation θh of the operation force applied to the operation handle 6 that is detected by the force detector 7 is outside the predetermined angle range, it is possible to correct the unintentional movement of the hands when the window 2, which is the work, is conveyed according to the target, and to move the window 2 smoothly when the trajectory is changed or modified.

Furthermore, by applying the control method for the power assist device 50 in which the predetermined angle range is divided into a first angle range on the inner side and second angle ranges positioned on both outer sides of the first angle range, the actuator 11 is controlled so as to move the operation handle 6 along the advancing direction A when the orientation θh of the operation force applied to the operation handle 6 that is detected by the force detector 7 is within the first angle range, and the actuator 11 is controlled so as to move the operation handle 6 in the direction determined by the advancing direction component of the operation force applied to the operation handle 6 and a corrected perpendicular direction component that is corrected to become less than a component of the operation force applied to the operation handle 6 in the direction perpendicular to the advancing direction A when the orientation θh of the operation force applied to the operation handle 6 that is detected by the force detector 7 is within the second angle range, it is possible to correct the unintentional movement of the hands when the window 2, which is the work, is conveyed according to the target, and to move the window 2 more smoothly without a sense of discomfort when the trajectory is changed or modified.

Furthermore, by applying the control method for the power assist device 50 in which the second angle range is divided into a plurality of angle ranges and the corrected perpendicular direction component is gradually increased with the transition toward the outer angle range from among the plurality of angle range, it is possible to correct the unintentional movement of the hands when the window 2, which is the work, is conveyed according to the target, and to move the window 2 more smoothly without a sense of discomfort when the trajectory is changed or modified. Furthermore, a smoother operation feel can be obtained by the divided angle ranges of smaller size.

By applying the control method for the power assist device 50 in accordance with the invention, it is possible to perform guiding with respect to the orientation of the desired course that has been set in advance even when the unintentional movement of the hands of the operator 1 has occurred in the direction of the operation force. Therefore, the operation handle 6, which is the operation section, moves in a fixed direction without displacement. As a result, the advancing direction accuracy is increased and, therefore, the window 2 can be moved in the desired direction and fitted into the body 100, while maintaining the position attained by alignment before the window 2 is fitted into the body 100. Thus, the displacement is prevented and positioning accuracy is increased. Furthermore, when the operation handle is wished to be moved in the direction other than the advancing direction that has been set in advance, for example, during position adjustment, this guide does not work. Therefore, free operation of the operator is not impeded. As a consequence, the operation time is shortened.

In the present embodiment, the operation of fitting the window 2 is explained by way of example, but this operation is not particularly limiting and the invention can be applied to a wide range of operations of assembling objects (works) in predetermined positions, and these operations may be performed using a robot.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention claimed is:

1. A control method for a power assist device comprising:
   operating an operation section by an operator,
   detecting an operation force applied to the operation section and an orientation of the operation force by a detection unit,
   supporting the operation section by a robot arm,
   driving the robot arm by a drive unit, wherein:
   if the orientation of the applied force is within a predetermined angle range with respect to a preset advancing direction, moving the operation section, by the drive unit, along the preset advancing direction;

if the orientation of the applied force is outside a predetermined angle range with respect to the preset advancing direction, moving the operation section, by the drive unit, along the orientation of the applied force.

2. The control method according to claim 1, further comprising:
dividing the predetermined angle range by the control unit into a first angle range and a second angle range; and
if the orientation of the applied force with respect to the preset advancing direction is within the first angle range, then moving the operation section along the preset advancing direction; and
if the orientation of the applied force with respect to the preset advancing direction is within the second angle range, then moving the operation section in a direction determined by an advancing direction component of the operation force applied to the operation section and a corrected perpendicular direction component that is corrected to become less than a component of the operation force applied to the operation section in the direction perpendicular to the preset advancing direction.

3. The control method according to claim 2, further comprising:
dividing the second angle range by the control unit into a plurality of angle ranges; and
increasing gradually the corrected perpendicular direction component by the control unit as the angle formed by the orientation of the operation force applied to the operation section and the preset advancing direction increases within the plurality of angle ranges.

4. The control method according to claim 2, further comprising changing the corrected perpendicular direction component according to a movement speed of the operating section.

5. The control method according to claim 2, further comprising changing the corrected perpendicular direction component according to a magnitude of the operation force applied to the operation section.

6. The control method according to claim 1, further comprising setting the preset advancing direction of the operation section to be a vertical downward direction.

7. A power assist device comprising:
an operation section to be operated by an operator;
an operation force detection unit that detects an operation force applied to the operation section and an orientation of the operation force;
a robot arm that supports the operation section;
a drive unit that drives the robot arm; and
a control unit programmed to control the drive unit so as to:
if the orientation of the applied force is within a predetermined angle range with respect to a preset advancing direction, move the operation section along the preset advancing direction;
if the orientation of the applied force is outside a predetermined angle range with respect to the preset advancing direction, move the operation section along the orientation of the applied force.

8. The power assist device according to claim 7,
wherein the predetermined angle range is divided into a first angle range and a second angle range;
wherein the control unit is programmed to control the drive unit so as to:
if the orientation of the applied force with respect to the preset advancing direction is within the first angle range, then move the operation section along the preset advancing direction; and
if the orientation of the applied force with respect to the preset advancing direction is within the second angle range, then move the operation section in a direction determined by an advancing direction component of the operation force applied to the operation section and a corrected perpendicular direction component that is corrected to become less than a component of the operation force applied to the operation section in the direction perpendicular to the preset advancing direction.

9. The power assist device according to claim 8, wherein the second angle range is divided into a plurality of angle ranges; and
the corrected perpendicular direction component is gradually increased as the angle formed by the orientation of the operation force applied to the operation section and the preset advancing direction increases within the plurality of angle ranges.

10. The power assist device according to claim 8, wherein the corrected perpendicular direction component is changed according to a movement speed of the operating section.

11. The power assist device according to claim 8, wherein the corrected perpendicular direction component is changed according to a magnitude of the operation force applied to the operation section.

12. The power assist device according to claim 7, wherein the preset advancing direction of the operation section is a vertical downward direction.

* * * * *